UNITED STATES PATENT OFFICE.

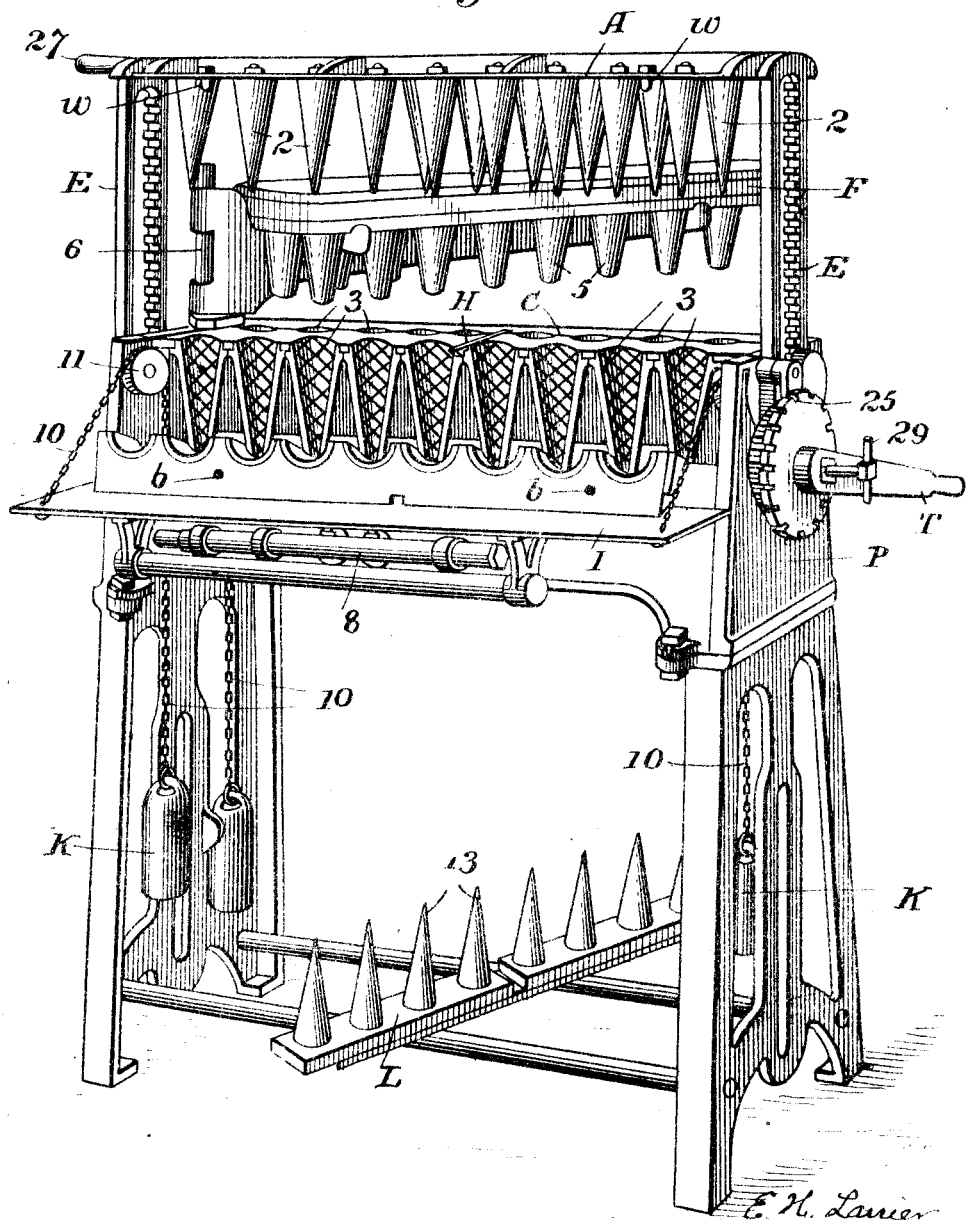

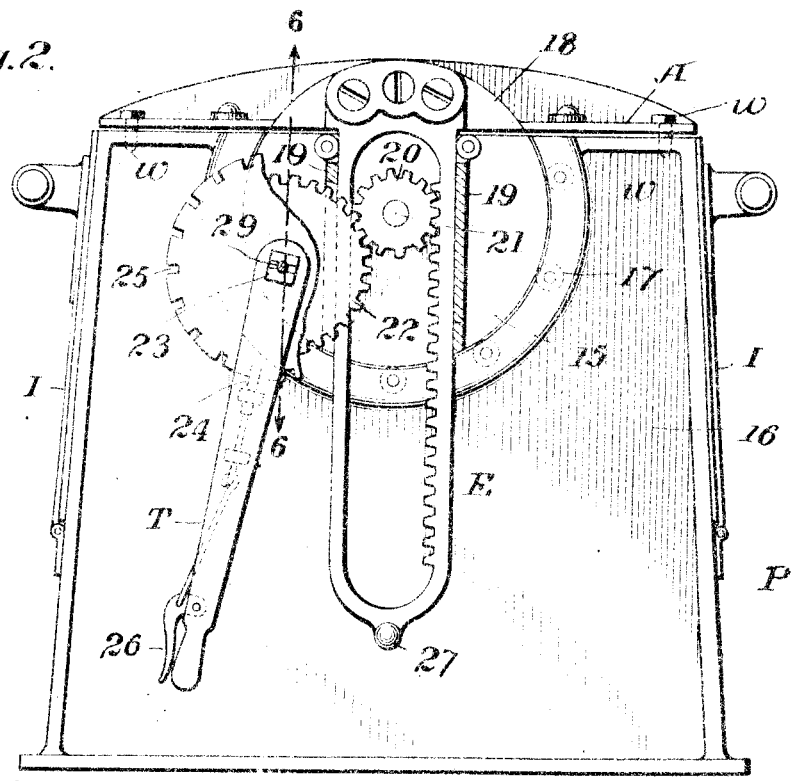
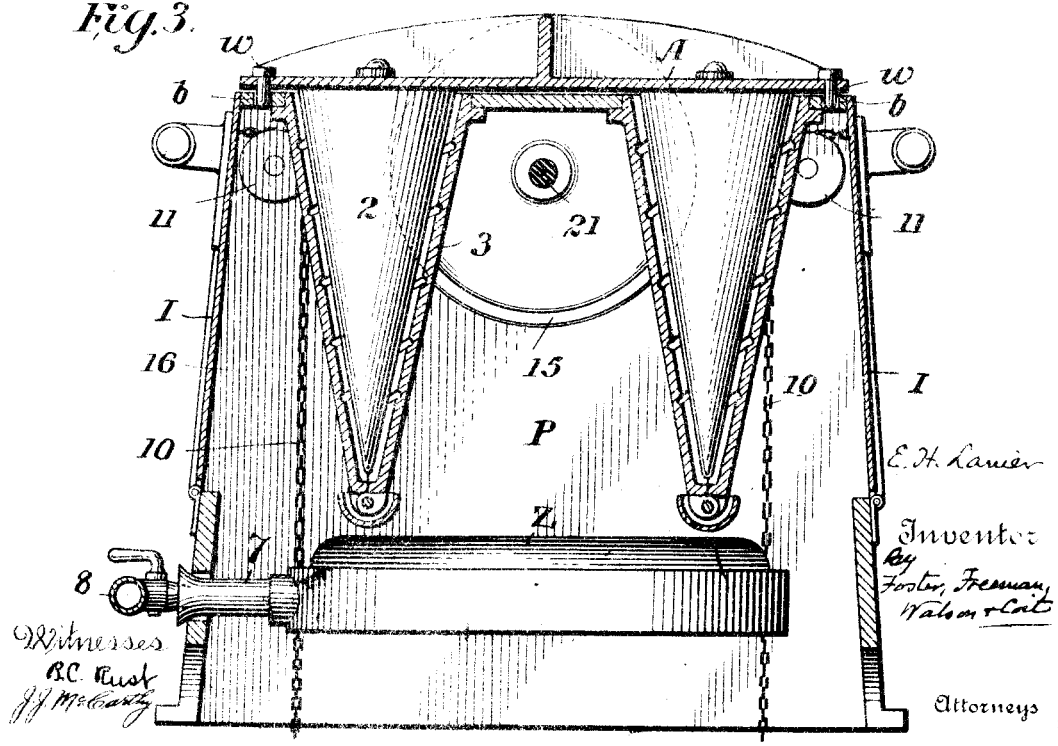

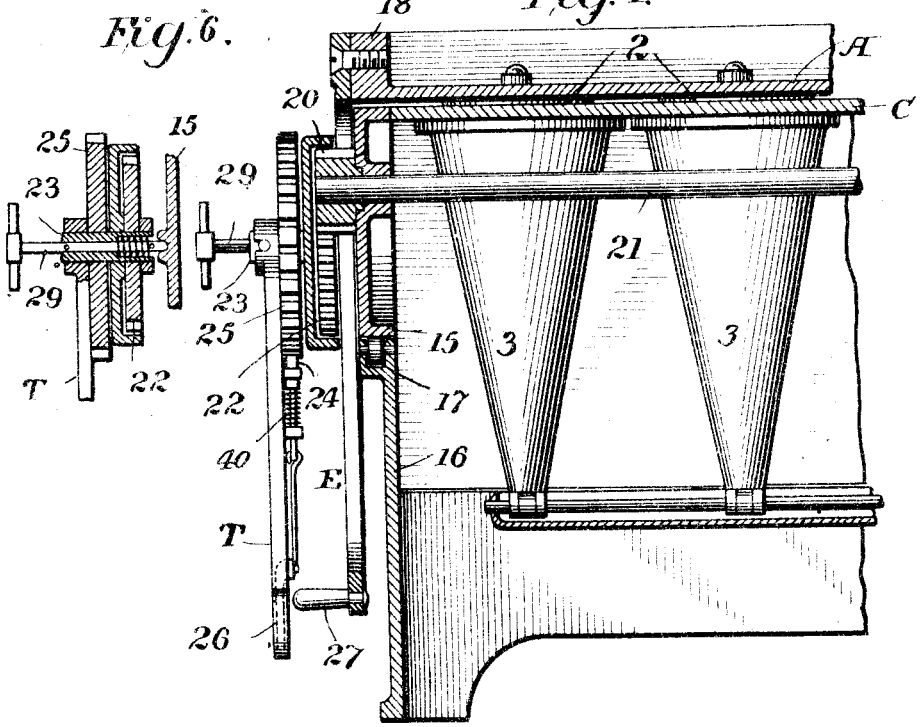

EDWARD H. LANIER, OF CINCINNATI, OHIO.

APPARATUS FOR AND METHOD OF MAKING PASTRY SHELLS.

1,063,981. Specification of Letters Patent. Patented June 10, 1913.

Application filed March 21, 1908. Serial No. 422,516.

*To all whom it may concern:*

Be it known that I, EDWARD H. LANIER, a citizen of the United States, residing at Cincinnati, in the county of Hamilton and State of Ohio, have invented certain new and useful Improvements in Apparatus for and Method of Making Pastry Shells, of which the following is a specification.

This invention relates to the manufacture of hollow shells of pastry of suitable forms for the reception of ices or other materials or articles used in pastry, and consists in an apparatus whereby to rapidly mold and bake the material used in the manufacture of such articles, as fully set forth hereinafter and as illustrated in the accompanying drawing, in which:

Figure 1 is a perspective view showing one form in which the apparatus may be used, one set of the sectional molds open in the position they would occupy after the shells had been baked and withdrawn therefrom; Fig. 2 is a partial end view in part section; Fig. 3 a transverse section; Fig. 4 a longitudinal section at one end of the apparatus; Fig. 5 shows a modification. Fig. 6 a section on the line 6—6, Fig. 2.

Before describing the details of the improved apparatus I will refer to those features which serve more directly to form from a suitable batter or paste a shell or receptacle in which to deposit ice cream, or any of the materials in pastry of various kinds. There is a cone, or preferably a series of cones. 2, which may be of any suitable shape, but, as shown, are strictly conical, and the batter or paste is sufficiently liquid to adhere to the cone when dipped therein. There is also a mold, or series of molds, 3, each corresponding in general form to the form of the cone, but a cavity in each section of the mold is larger than the cone to the extent required to produce the shell of required thickness, and preferably the said cavity is provided with suitable depressions or grooves and ribs into which the paste may be pressed to thereby form upon the article produced any desired pattern in relief, and the molds are externally heated. The cones are first dipped in the batter which adheres thereto, and are then carried and forced into the molds, and the heating of the latter serves to bake the material, and in order to separate it from the molds the latter are sectional, one section being hinged so as to swing away from the other.

The above described parts, while they may be supported and arranged in different ways in a machine intended to produce a large number of articles at one time, are shown in the drawing in the construction and arrangement which has been found most suitable. The cones may be in one or two series; as shown they are in two parallel series of nine cones each, connected together by a plate A constituting a support therefor, and two like series of molds are connected to a plate C constituting a support therefor, and each series of molds is divided vertically, the outer sections being hinged to the inner sections at the bottom so as to swing outward, and when the swinging sections are brought together they are locked in place, partly by a spring clip H, and partly by pins $w$, projecting downward from the support A of the cones into recesses $b$ in the connecting plate of the swinging sections of the mold.

The molds are suitably supported by the framework of the machine, and the support A of the cones is provided with vertical guide-bars E to permit the said support to be raised or lowered to carry the cones out of and into the molds, and a paste carrier F is suitably supported so that it may be carried beneath the cones, which may then be dipped into the paste carrier, and then elevated. The carrier may be a simple trough, or, as shown, may consist of a series of receptacles 5, corresponding in arrangement with that of the cones. As shown the paste carrier F is supported to swing at one end upon a vertical pintle 6, connected with the frame of the machine so that it may be carried beneath the cones, or swung to one side out of the way.

With the molds is combined any suitable heating apparatus. As shown there is an oven or casing P, rectangular in shape and provided at the bottom with a gas burner Z to which a mixture of gas and air is supplied from mixing tubes 7, arranged opposite gas jets supplied by a pipe 8, supported upon the outside of the casing.

Each side I of the casing is hinged at the bottom so as to fall outward, as shown in Fig. 1, and the outwardly hinged section of the mold may also swing outward at the same time, and to prevent any shock resulting from sudden movements, the dropping side of the casing is suitably counterbalanced, as by means of a chain 10, passing over a pulley 11, at the inside of the casing and connected with a weight K. It will of course be understood that when there is only a single row of molds, only one side of the casing will drop, but where there are a series of molds both sides of the casing will drop, and each is suitably counterweighted.

After the articles have been baked the cones are raised, but the shells will adhere to the molds, especially when the latter are ribbed and have projections for forming ornaments on the exterior of the shells, and after the lifting of the cones a carrier L, consisting of a wooden bar provided with a series of wooden cones 13, is introduced into the shells; the sides of the molds are dropped outward, and the carrier L takes with it the shells without the necessity of handling the latter, and the shells may be thereafter readily removed from the holder for use.

While the above described parts may be used as set forth, it is found preferable in some cases, in order to more effectively and evenly cook the paste, to be able to reverse the cone and mold holders with their cones and molds, to bring the upper portions opposite the flame of the heater, and my apparatus is especially constructed to make such reversal. Thus the holder C of the series of molds is provided at each end with a segment of a disk 15, which fits a curved recess in the end 16 of the casing, and each of said segments may rest in the recess, or preferably upon antifriction rollers 17, and upon the cone holder A at each end is another segment 18 which, with the segment 15 completes a round disk when the two holders are together as shown in Fig. 2, so that both parts may be turned together within the curved recesses of the ends of the casing.

In order to support the cone holder or carrier in its position in respect to the carrier or support of the molds, while permitting the cone carrier to be raised and lowered, each of the guide-bars E of the cone support is fitted to slide between guides 19 at the outside of the disk 15, and the prallelism of the support A to the support C is maintained by providing each guide-bar with a rack to engage a pinion 20, the two pinions 20 being upon opposite ends of a shaft 21, extending through the disks across the machine so that both will turn together and operate to raise the respective ends of the support A in unison. It will be seen that these guide bars and racks being carried by the disks 15, while permitting the adjustment of the support A in respect to the support C, retain their relative position whatever may be the position to which the parts are turned, and that therefore the said parts may be turned so as to bring either end or either side of the molds into position to be properly heated by the heater. Preferably each guide-bar consists of two parallel rods or bars, one of which only has a rack upon it as this secures a better bearing.

Any suitable means may be employed for turning the pinion 20, but, as shown, the pinion is wide enough to mesh with the teeth of a spur wheel 22, the shaft 23 of which has its bearings in the parts carried by the disk 15, and is provided with a handle T by means of which it may be turned.

In order to hold the handle in any position in which it may be placed it is provided with a lock bolt 24, the end of which is adapted to the teeth of a notched disk 25 secured in a stationary position upon the guides 19, and this bolt is connected to be operated by means of a latch 26, pivoted to the handle T, so that when the end of the handle and the said latch are gripped by the hand the bolt will be withdrawn, and on releasing the grip upon the latch 26, a spring 40, will throw the bolt 24 inward. The bars E may be provided with handles 27 which may be seized in order to turn the disks and the parts carried thereby. When the handle is operated to turn the pinions 20 and raise the support A, it is best to lock the support C in place, which may be done by means of a pin 29.

In coating the cones it is not necessary to swing the batter receptacle below the cones. The oven and core plate supports may be pivoted to swing to one side so as to dip the cones into a receptacle at that side as indicated in Fig. 5. The core plate in such case is on trunnions so as to maintain its horizontal position. After thus coating the cores the parts are then carried to a vertical position and the cones lowered into the molds. It will be seen that by thus coating the cones it is possible to secure a very thin coating and to avoid baking the batter until the cones are in position on the molds.

As previously stated, my invention is designed for the manufacture of hollow shells of pastry of suitable forms for holding ices and other materials. While I have used the term "cones" in describing the male dies of the molds, it is to be understood that both the male and female dies may be varied as to shape to produce hollow pastry shells of any desired form. It will also be obvious that various other changes in details of the mechanism described may be made without departing from the spirit and scope of the invention.

Therefore without limiting myself to the particular construction and arrangement of parts shown and described, I claim as my invention,—

1. In a machine for making pastry shells, the combination of a series of molds, a corresponding series of cone , and a pastry receptacle constructed to permit the vertical introduction and withdrawal of the cones, the cones and receptacle being relatively movable to a position to permit the cones to be moved into and out of the receptacle.

2. In a machine for making pastry shells, the combination of a series of molds, a corresponding series of cones supported to move into and out of the molds, and a pastry receptacle open at the top to permit the vertical introduction and withdrawal of the cones, the receptacle and the cones being relatively movable to a position to permit the cones to be carried into and out of said receptacle.

3. In a machine for making pastry shells, the combination of a series of molds, a corresponding series of cones supported to move into and out of the molds, a pastry receptacle open at the top to permit the vertical introduction and withdrawal of the cones, the receptacle and the cones being relatively movable to a position to permit the cones to be carried into and out of said receptacle, and means for heating the molds.

4. In a machine for making pastry shells, the combination of a series of molds, a corresponding series of cones, supported to move into and out of the molds, a pastry receptacle open at the top to permit the vertical introduction and withdrawal of the cones, the receptacle and the cones being relatively movable to a position to permit the cones to be carried into and out of said receptacle, an oven or casing receiving the molds, and means for heating the oven.

5. In a machine for making pastry shells, the combination of a series of molds, a corresponding series of cones supported to move to and from the molds, and a pastry receptacle pivotally supported to swing to and from a position beneath the cones and open at the top to permit the introduction and withdrawal of the cones.

6. In a machine for making pastry shells, the combination of a series of molds, a support therefor, a like series of cones and a support therefor, guide-bars upon the cone support fitted to slide in guides on the mold support, and a pastry receptacle pivotally supported to swing to and from a position below the cones and open at the top to permit the introduction and withdrawal of the cones.

7. In a machine for making pastry shells, the combination of a series of molds, a support therefor, a like series of cones and a support therefor, guide-bars upon the cone support fitted to slide in guides on the mold support, a pastry receptacle pivotally supported to swing to and from a position below the cones and open at the top to permit the introduction and withdrawal of the cones, a casing arranged to receive the molds and a heater for heating said casing.

8. In a machine for making pastry shells, the combination of a series of molds, a series of cones, means whereby the cones are carried into and out of the molds, a pastry receptacle movable to and from position between the cones and molds, supports arranged to permit the rotation of the molds and cones when together, a casing in which the same may be rotated, and means for heating the casing.

9. The combination of a casing, a series of molds, a series of cones, supports for the molds and cones supported to be rotated in said casing, guide-bars connected with the cone support and adapted to slide in bearings of the mold support, and racks on said guide-bars adapted to pinions carried by the mold support.

10. The combination of a casing, a series of molds, a series of cones, supports for the molds and cones supported to be rotated in said casing, guide-bars connected with the cone support and adapted to slide in bearings of the mold support, racks on said guide-bars adapted to pinions carried by the mold support, and means for rotating said pinions together.

11. The combination of a casing, a series of molds, a series of cones, supports for the molds and cones supported to be rotated in said casing, guide-bars connected with the cone support and adapted to slide in bearings of the mold support, racks on said guide-bars adapted to pinions carried by the mold support, a gear and handle for turning said pinions, and means for locking said handle in any position to which it is adjusted.

12. The combination of a casing, cone and mold supports supported to rotate within the casing, and rack bars extending from the cone support and sliding in bearings of the mold support and provided with handles whereby to rotate said supports.

13. The combination of a series of two-part molds, one section hinged to the other, a support for one of the said sections, a series of cones, a support therefor adjustable to permit the cones to be carried into and out of the molds, a heater for heating the molds, and means for rotating the supports and their molds and cones in respect to the heater.

14. The combination of a support, a series of molds carried thereby, each mold having a movable section hinged to fall outward, a series of cones, a support therefor adjustable to permit the cones to be carried into and out of the molds, and means for reversing the said supports with the parts carried thereby.

15. The combination of a series of molds each consisting of two hinged sections, a series of cones movable to and from the molds, a casing having side hinged to drop outward, and a counterbalance weight for the said side.

16. The combination of a series of sectional molds, the outer sections of the molds hinged to drop outward, a casing with a hinged side, means for locking the hinged section of the molds and the hinged side of the casing in position and for releasing the same, and means for counterbalancing the hinged side of the casing.

17. The combination in a machine of the character described, of a supporting frame, a batter receptacle supported by said frame, a female die mounted to swing in the frame, and a male die supported to swing with the female die and independently movable to and from the batter receptacle and, to and from the female die.

18. The combination in a machine of the character described, of a supporting frame, a female die carried by said frame, a male die connected with the frame and movable to and from the female die, and a batter receptacle, said receptacle and male die being relatively movable whereby said die may be coated with batter in the receptacle.

19. The combination in a machine of the character described, of a supporting frame, a female die carried by said frame, a male die mounted on the frame and movable to and from the female die, and a batter receptacle open at the top, supported at one side of the female die, said receptacle and male die being relatively movable to permit the male die to be coated with batter in said receptacle.

20. The combination, in a machine of the character described, of a series of molds or female dies, a series of cones or male dies, relatively movable supports for said parts permitting engagement and separation of the molds and cones at will, a batter receptacle, said receptacle and cones being relatively movable, means for moving the cone support relatively to the molds and to the batter receptacle whereby the cones may be, successively, withdrawn from the molds, moved into and from the batter receptacle, and returned to the molds, and heating means for baking the batter introduced into the molds by the cones.

21. The combination, in a machine of the character described, of a series of molds or female dies, a series of cones or male dies, relatively movable supports for said parts permitting engagement and separation of the molds and cones at will, a batter receptacle, said receptacle and cones being relatively movable, means for effecting relative movement between the cone support and molds and between the cone support and batter receptacle whereby the cones may be, successively, withdrawn from the molds, moved into and from the batter receptacle, and returned to the molds, and heating means for baking the batter introduced into the molds by the cones.

22. The combination, in a machine of the character described, of a series of molds or female dies, a series of cones or male dies, relatively movable supports for said parts permitting the engagement and separation of the molds and cones at will, a batter receptacle having a series of compartments open at the top and corresponding in number and relative arrangement to the cones, said receptacle and cones being relatively movable, means for effecting relative movement between the cone support and molds and between the cone support and batter receptacle whereby the cones may be, successively, withdrawn from the molds, coated with batter in the batter receptacle, and returned to the molds, and heating means for baking the batter introduced into the molds by the cones.

23. The combination, in a machine of the character described, of a frame, relatively movable male and female dies connected with the frame, and a batter receptacle, said male die and batter receptacle being relatively movable, whereby the male die may be coated with batter in the receptacle.

24. The combination, in a machine of the character described, of a frame, a plurality of separable male and female dies connected with the frame, means for effecting separation of said dies, and a batter receptacle, said receptacle and male die members being relatively movable, whereby said male dies may be coated with batter in the receptacle.

25. The combination, in a machine of the character described, of a frame, a plurality of female dies supported by the frame, a plurality of male dies connected with the frame and movable to and from the female dies, and a batter receptacle having a plurality of pockets corresponding in number and arrangement to the male dies, said receptacle and male dies being relatively movable, whereby the male dies may be coated with batter in the receptacle and then introduced into the female dies.

26. A molding machine of the class set forth, comprising a pair of separable matrix and core members, a frame in which said members are rotatably mounted having a journal and guide, means for raising one of said members clear of the other in said guide, means for holding said members together in said journal to complete a mold cavity, heating means to which the sides of said matrix and core members are reversibly exposed, and means for turning said members over in said journal to expose their opposite faces to said heating means.

27. In a machine for making pastry shells, the combination of a series of vertically arranged female molds or dies each comprising two sections hinged together at their lower ends, a corresponding series of male dies mounted to move into and from the female dies, and means for heating the dies.

28. In a machine for making pastry shells, the combination of a series of vertically arranged female molds or dies each comprising a plurality of laterally separable sections, a corresponding series of male dies movable into and from the female dies, means for locking the movable sections of the female dies in closed position adapted to be automatically rendered inoperative as the male dies are withdrawn from the female dies, and means for heating the dies.

29. In a machine for making pastry shells, the combination of a series of female molds or dies mounted to rock about a horizontal axis, and each comprising a plurality of laterally separable sections, a corresponding series of male dies adapted to be moved into or from the female dies when the latter are in vertical position with their open ends upward and when within said female dies to turn therewith about the aforesaid axis, and means for heating the dies.

30. The method of forming and baking pastry shells by means of co-acting male and female dies which comprises applying to the male die a coating of the material to be baked, then inserting the die in the female die, and then baking the material between the dies.

31. The method of forming and baking pastry shells by means of co-acting male and female dies which comprises dipping the male die in a batter or paste of the material to be baked, then inserting the coated die in the female die, and then baking the material between the dies.

32. The method of forming and baking pastry shells by means of co-acting male and female dies which comprises heating the male die, then applying to the heated male die a coating of the material to be baked, then inserting the coated die in the female die, and then baking the material between the dies.

33. The method of forming and baking pastry shells by means of co-acting male and female dies which comprises heating the male die, then dipping the heated male die in a batter or paste of the material to be baked, then inserting the coated die in the female die, and then baking the material between the dies.

34. In a machine for making pastry shells, the combination of relatively movable male and female dies, a batter receptacle, and a movable support for said batter receptacle adapted to carry it into position intermediate said dies when they are separated, the male die being movable into said batter receptacle to coat the same with batter.

35. In a machine for making pastry shells, the combination of male and female dies relatively movable in a vertical direction, and a batter receptacle movable into and out of position between said dies, the male die being movable into and out of the batter receptacle.

36. In a machine for making pastry shells, the combination of a support for a plurality of female dies, a support for a plurality of male dies, said supports being relatively movable in a vertical direction, and a batter receptacle movable into and out of position between the dies on said supports, the said male die support being movable to and from the batter receptacle to coat the dies with batter.

37. In a machine for making pastry shells, the combination of a support for a plurality of female dies, a support for a plurality of male dies, said supports being relatively movable, and a batter receptacle movable to and from position between said male and female dies, the male die support being movable to and from the batter receptacle when the latter is in said intermediate position to coat the dies with batter.

In testimony whereof I affix my signature in presence of two witnesses.

EDWARD H. LANIER.

Witnesses:
F. K. DRIESBACH,
JOHN J. KINNEY.